US009727410B2

(12) United States Patent
Gujja et al.

(10) Patent No.: US 9,727,410 B2
(45) Date of Patent: Aug. 8, 2017

(54) HANDLING ERRORS WHEN TRANSFERRING DATA

(71) Applicant: CA, Inc., New York, NY (US)

(72) Inventors: Sai Swetha Gujja, Lisle, IL (US); Jammie Pringle, Lisle, IL (US); Frederic Duminy, Lisle, IL (US)

(73) Assignee: CA, INC., New York ( * ) Notice: Subject to any disclaimer, the term of this patent is extended or adjusted under 35 U.S.C. 154(b) by 79 days.

(21) Appl. No.: 14/810,150

(22) Filed: Jul. 27, 2015

(65) Prior Publication Data

US 2017/0033896 A1 Feb. 2, 2017

(51) Int. Cl.
*H04L 1/00* (2006.01)
*G06F 11/07* (2006.01)

(52) U.S. Cl.
CPC ...... *G06F 11/0793* (2013.01); *G06F 11/0709* (2013.01); *G06F 11/0751* (2013.01)

(58) Field of Classification Search
CPC .................................................... H04L 1/0045
USPC ............................ 714/746, 752, 47.1, 57, 10
See application file for complete search history.

(56) References Cited

U.S. PATENT DOCUMENTS

| | | | | |
|---|---|---|---|---|
| 5,720,032 A | * | 2/1998 | Picazo, Jr. | H04L 12/44 370/351 |
| 5,796,941 A | * | 8/1998 | Lita | G06F 21/53 714/47.1 |
| 6,108,741 A | * | 8/2000 | MacLaren | G06F 13/4036 710/108 |
| 6,675,230 B1 | * | 1/2004 | Lewallen | G06F 9/4433 715/744 |
| 2003/0126195 A1 | * | 7/2003 | Reynolds | G06F 1/14 709/203 |
| 2007/0061334 A1 | * | 3/2007 | Ramer | G06F 17/30867 |

* cited by examiner

*Primary Examiner* — Fritz Alphonse
(74) *Attorney, Agent, or Firm* — Fabian Vancott; Steven Nichols

(57) ABSTRACT

A computer-implemented method for handling errors is described. According to the method, a data bridge structure is received. The data bridge structure includes data being communicated between a driving caller using a first computer language layer and a set of computer code using a second computer language layer. In the method, the call between the computer language is re-driven in response to an error occurring. The re-driven call obtains an updated data bridge structure. In the method, the updated data bridge structure is returned to the caller in the first computer language layer driving the call.

20 Claims, 7 Drawing Sheets

HANDLING ERRORS WHEN TRANSFERRING DATA

BACKGROUND

A computer uses binary representations of computer code and computer data to perform tasks and calculations. Users programming the computer use computer language layers to provide an abstraction from the details of the computer hardware. Users programming the computer write computer program code. The computer program code is converted into binary instructions to manipulate data on the computer. The computer language uses a set of modules to perform a set of tasks. Different computer languages and different computer language layers may use different data formats to represent data.

SUMMARY

In one example, a computer implements a method for handling errors. According to the method, a data bridge structure is received from a second computer language layer. The data bridge structure includes data being communicated between a driving caller using a first computer language layer and a set of computer code using a second computer language layer. According to the method, the call between the computer language layers is re-driven in response to an error occurring to obtain an updated data bridge structure. According to the method, the updated data bridge structure is returned to the caller in the first computer language layer that is driving the call.

In another example, a system for transferring data between computer language layers is described. The system includes a processor, memory communicatively connected to the processor, and an error correction system. The error correction system includes a receiving engine to receive, from a second computer language layer, a data bridge structure. The data bridge structure includes data being communicated between a driving caller using a first computer language layer and a set of computer code using a second computer language layer. The error correction system includes an examine engine to examine the data bridge structure to determine when an error has occurred. The error correction system includes an act engine to act, based on the error, to resolve a cause of the error. The error correction system includes a re-drive engine to re-drive, in response to an error occurring, the call between the computer language layers, to obtain an updated data bridge structure. The error correction system includes a return engine to return the updated data bridge structure to the caller in the first computer language layer driving the call.

In still another example, a computer program product to transfer data between computer language layers is described. The computer program product includes a non-transitory tangible computer readable storage medium. The tangible computer readable storage medium includes computer readable program code embodied therewith. The computer readable program code, when executed by the processor, cause the processor to receives, from a second computer language layer, a data bridge structure. The data bridge structure includes data being communicated between a driving caller using a first computer language layer and a set of computer code using a second computer language layer.

The computer readable program code, when executed by a processor, acts, based on the error, to resolve a cause of the error. The computer readable program code, when executed by a processor, re-drives, when an error occurs, the call between the computer language layers to obtain an updated data bridge structure. The computer readable program code, when executed by a processor, returns the updated data bridge structure to the caller in the first computer language layer driving the call.

BRIEF DESCRIPTION OF THE DRAWINGS

Aspects of the present disclosure are illustrated in the accompanying drawings by way of example. The accompanying drawings do not limit the scope of the claims.

Throughout the drawings, identical reference numbers designate similar, but not necessarily identical, elements.

DETAILED DESCRIPTION

Figure 1:
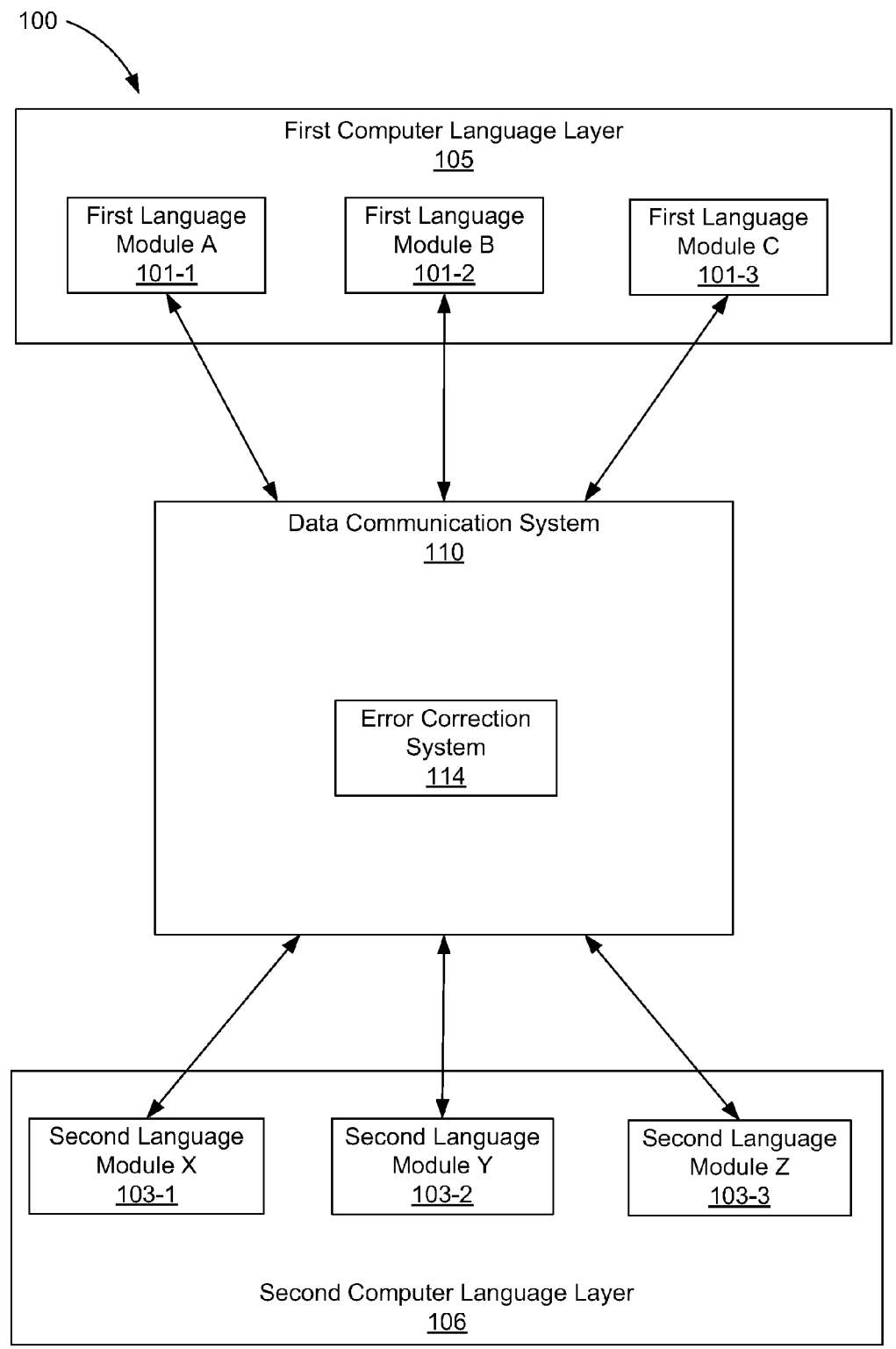
FIG. 1 is a diagram of a system for handling errors when transferring data between computer language layers using a data bridge structure, according to one example of principles described herein.

The present specification describes a method, system, and computer program product for handling errors when transferring data between computer language layers using a data bridge structure, such that a number of interfaces between the first set of computer code using the first computer language layer and the second set of computer code using the second computer language layer use an error handling interface.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to examples of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figs. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular aspects and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function, in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

A computer language is used to perform functions on a computing device. In some examples, multiple computer languages may be used. In this example, one computer language may be used instead of another computer language to perform a particular function. A number of computer language layers may communicate with one another to facilitate operations being performed by each computer language layer. In this manner, each computer language layer may perform a task instead of another computer language layer. The different computer language layers may have different data formats. A first computer language layer that interacts with a second computer language layer converts the data into a format used by the second set of computer code using the second computer language layer. A number of modules in a number of computer language layers may use a data bridge transferring system to handle data being communicated between the computer language layers. The data bridge system allows a number of modules to share data transformation between the first set of computer code using the first computer language layer and the second set of computer code using the second computer language layer using a data bridge structure without replicating the data transformation code. While operating on the data bridge structure, the second set of computer code using the second computer language layer may encounter a number of errors. The errors may indicate conditions that could be resolved by code outside of the second computer language layer. An error handling system determines when an error occurs and acts to correct the error. The error handling system then interacts with the second set of computer code using a second computer language layer to re-drive the interface that produced the error. The communication with the second computer language layer may succeed once the error has been resolved.

According to the principles described herein, a system for handling errors communicating between a first computer language layer and a second computer language layer using a data bridge structure may allow a number of interfaces to use the data bridge structure without replicating code to handle errors when communicating with other computer language layers. The error handling system receives a data bridge structure being returned to a caller in a first computer language layer driving a call to a second set of computer code using the second computer language layer. The error handling system re-drives the call to the second set of computer code using the second computer language layer to obtain an updated data bridge structure. The error handling system returns the updated data bridge structure to the caller in the first computer language layer driving the call.

As used in the present specification and in the appended claims, the term "a number of" or similar language may include any positive number, including one to infinity; zero not being a number, but the absence of a number.

Still further, as used in the present specification and the appended claims, the term "computer language layer" refers broadly to a component or number of components that use a particular computer language. A computer language layer may include an entire computer program, or may represent a portion of a computer program that controls the activity of a computing device.

Still further, as used in the present specification and the appended claims, the term "data bridge structure" refers to a data structure that can be used to communicate data between a number of different computer language layers.

Still further, as used in the present specification and the appended claims, the term "call" refers to an interaction between two computer language modules. A call may appear to be a function or a procedure call within a computer language layer.

Still further, as used in the present specification and the appended claims, the term "caller" refers to a first set of code that interacts with a second set of computer code.

Still further, as used in the present specification and the appended claims, the term "drive" refers to causing a processor to perform an action. Driving a call refers to causing a processor to execute code that performs a function.

Even further, as used in the present specification and the appended claims, the terms "transform" or "convert" refer broadly to making a change in the form, appearance, or character of data. The data may still be interpreted as representing the same information. The interpretation of the post-transformation data may be different from the interpretation of the pre-transformation data.

Referring now to the figures, FIG. 1 is a diagram of a system (100) for handling errors when transferring data between computer language layers (105, 106) using a data bridge structure, according to one example of principles described herein. The system (100) includes a data communication system (110). The data communication system (110) transfers data from a first computer language layer (105) to a second computer language layer (106). The first computer language layer (105) includes a driving caller (107). The driving caller (107) uses a first language layer module (101) to drive a call to send a data bridge structure to a second language layer module (103). The data communication system (110) includes an error correction system (114). The error correcting system (114) handles errors that occur when a first computer program layer (105) communicates with a second computer language layer (106). The data bridge structure may include data being returned to a caller in a first computer language layer (105) driving a call to a second set of computer code in a second computer language layer (106). The error correcting system (114) re-drives the call between the computer language layers (105, 106) to obtain an updated data bridge structure. The error correcting system (114) returns the updated data bridge structure to the caller in the first computer language layer (105).

A first set of computer code using the first computer language layer (105) includes a number of first language modules (101-1, 101-2, 101-3). As illustrated in FIG. 1, the first set of computer code using the first computer language layer (105) includes first language module A (101-1), first language module B (101-2) and first language module C (101-3). Any of the first language modules (101) may be a caller of a module using the second computer language layer (106). A caller is a set of computer code using the first computer language layer (105). Similar to the first set of computer code using the first computer language layer (105), the second set of computer code using the second computer language layer (106) includes a number of modules (103). As illustrated, the second set of computer code using the second computer language layer (106) includes second language module X (103-1), second language module Y (103-2) and second language module Z (103-3). Each module (103) in the second set of computer code using the second computer language layer (106) may also have a number of interfaces The first language modules (101) may each communicate a data bridge structure using the data bridge transferring system (110). The communication using the data bridge structure is initiated with a call to a second set of computer code using a second computer language layer. The data bridge transferring system (110) transforms the data bridge structure and transmits the transformed structure to computer code using the second language layer (106). The different language modules (101) may each communicate different data in different formats to the data bridge transferring system (110) for transformation through a number of different interfaces. A module (101) may include a number of interfaces to communicate with other modules. For example, the modules (103) in the second set of computer code using the second computer language layer (106). The transformed data bridge structures is then be communicated to a number of different interfaces in the second set of computer code using the second computer language layer (106). The data bridge transferring system (110) allows a first language module (101) to communicate with a second language module (103) in the second set of computer code using the second computer language layer (106). The second set of computer code using the second computer language layer (106) then uses the data bridge structure. The second set of computer code using the second computer language layer (106) returns the data bridge structure. The second set of computer code using the second computer language layer (106) may record information relating to an error in the data bridge structure to communicate the error to the caller using the first computer language layer (105).

In some cases, the error correction system (114) is a part of the data transfer system (110). The designated functions of the error correction system (114) may be implemented as a part of the data transfer system (110). The error correction system (114) may be implemented as a separate system. In one example, the modules (101) in the first computer language layer (105) may communicate with the error correction system (114). The error correction system (114) then communicates with the data transfer system (110). When an error occurs, the error correction system (114) corrects the condition that caused the error and communicates with the modules (103) in the second computer language layer (106) using the data communication system (110). In another example, the data communication system (110) is communicatively connected to the error correction system (114). When an error occurs, the data communication system (110) uses the error correction system (114) to correct the error. The error transferring system (114) then causes the communication using the data communication system (110) to be re-driven.

A specific example of handling an error when communicating between computer language layers (105, 106) follows. In this example, the first set of computer code using the first computer language layer (105) is an application. The application communicates with a second set of computer code using a second computer language layer (106) using a data bridge structure and a data transferring system. A second set of computer code operates on the data bridge structure and encounters an error. The error is caused by a resource used by the second set of computer code using the second computer language layer (106) being busy. The error that is encountered is transient in nature. The data indicates that the error is to be returned to the data transfer system (110). The data transfer system (110) uses an error correction system (114) to correct the error. The error correction system (114) receives the data bridge structure from the second set of computer code using the second computer language layer (106). The error correction system (114) re-drives the call between the computer language layers to obtain an updated data bridge structure. The error correction system (114) returns the updated data bridge structure to the caller in the first computer language layer driving the call.

Figure 2:
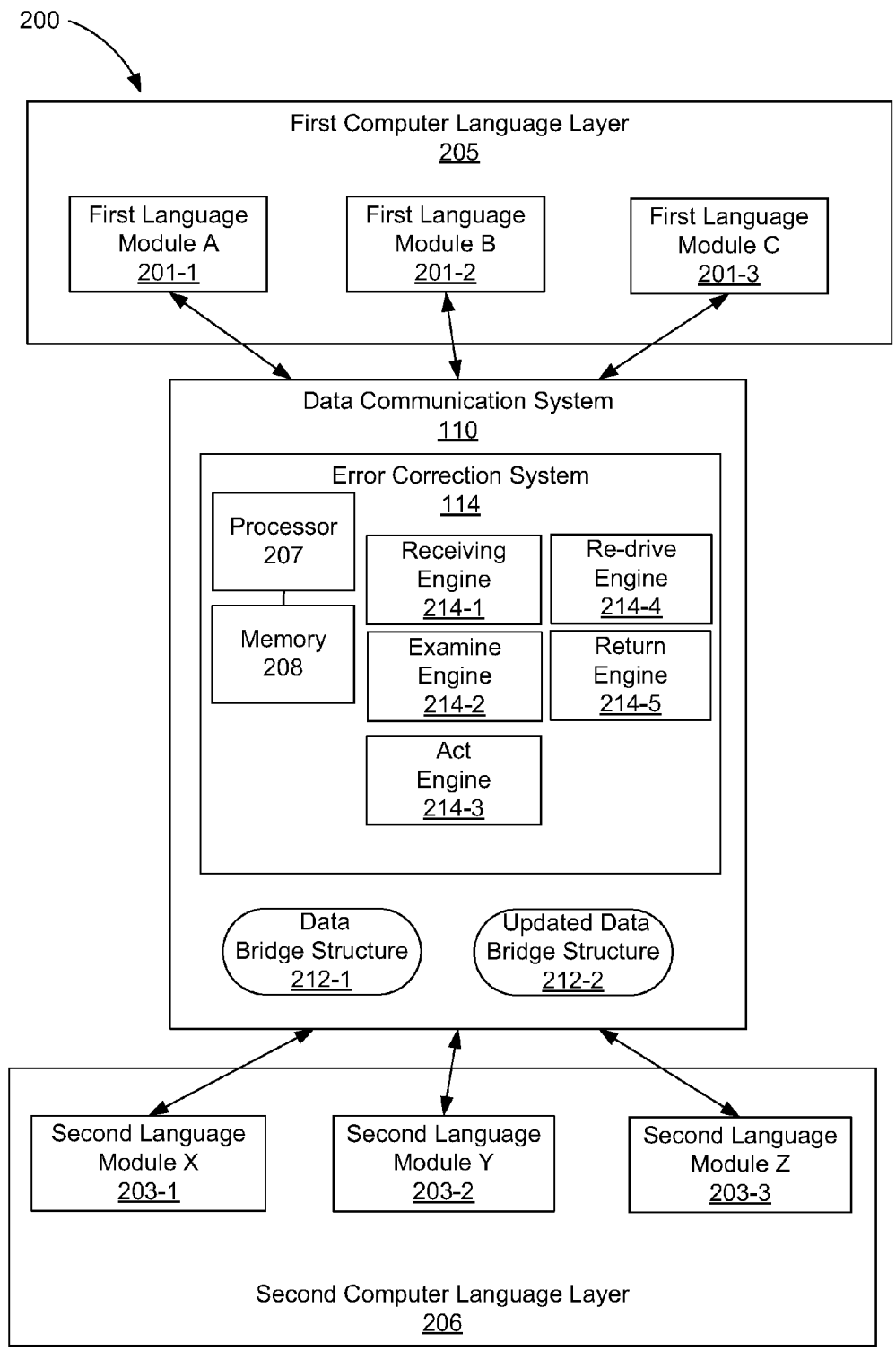
FIG. 2 is a diagram of a system for handling errors when transferring data between computer language layers using a data bridge structure, according to another example of principles described herein.

FIG. 2 is a diagram of a system (200) for handling errors when transferring data between computer language layers (205, 206) using a data bridge structure (212-1), according to another example of principles described herein. As illustrated in FIG. 1, an environment includes a data bridge transferring system (110), a first computer language layer (205), and a second computer language layer (206). The first set of computer code using the first computer language layer (205) includes a driving caller. The driving caller includes a number of first language modules (201-1, 201-2, 201-3). Each module (201) may include a number of interfaces to communicate with other modules (201, 203). The first language modules (201) communicate with a second computer language layer (206) through the data bridge transferring system (110). The second set of computer code using the second computer language layer (206) includes a number of second language modules (203-1, 203-2, 203-3). The second set of computer code using the second computer language layer (206) operates on the data bridge structure. The second set of computer code using the second set of computer language layer (206) encounters an error. The error and the data bridge structure are returned to the data communication system (110) to transfer to the first set of computer code in the first computer language layer. The data communication system (110) uses an error correction system (114) to correct the error and re-drive the communication.

The data bridge transferring system (110) may be implemented on a computing device executing both the first set of computer code using the first computer language layer (205) and the second set of computer code using the second computer language layer (206). When the first set of computer code using the first computer language layer (205) and the second set of computer code using the second computer language layer (206) are executing on separate computing devices, the data bridge transferring system (110) may reside on either computing device. Alternatively, the data bridge transferring system (110) may reside on a separate computing device.

The error correction system (114) may be implemented on the same computing device as the data bridge transferring system (110). When an error occurs in communicating data from a first set of computer code in the first computer language layer (105) to a second set of computer code in the second computer language layer (106), the error may be communicated back to the first set of computer code in the first computer language layer using a data bridge structure (212-1). The error correction system (114) handles the error, and re-drives the communication between the first set of computer code in the first computer language layer (205) and the second set of computer code using the second computer language layer (206) to obtain an updated data bridge structure (212-2). The error correction system (114) then communicates the updated data bridge structure (212-2) to the first set of computer code in the first computer language layer (205). When the first set of computer code using the first computer language layer (205) and the second set of computer code using the second computer language layer (206) are executing on separate computing devices, the error correction system (114) may reside on either computing device. Alternatively, the data bridge transferring system (110) may reside on a separate computing device. The error correction system (114) includes a processor (207) communicatively connected to memory (208). The error correction system (110) also may include a number of engines (214). The engines (214) may be implemented as computer program code which, when executed by the processor (207), performs a designated function. The engines (214) may be implemented as a combination of hardware and program instructions to perform a designated function. The program code causes the processor to execute the designated function of the engine.

As described above, the data bridge transferring system (110) receives a data bridge structure (212-1). The data bridge structure (212-1) represents a computer data structure for communicating data between the first set of computer code using the first computer language layer (205), and the second set of computer code using the second computer language layer (206). The data bridge structure (212-1) includes a mixture of character data and binary data. Character data represents data in a character set that can be presented to a user. Binary data represents data that is interpreted by a computer. Binary data may include integers, floating point values, or abstract data structures that combine a number of different data formats. The data bridge structure (212-1) may include a buffer, the buffer being a field that temporarily stores data until it is processed. The buffer may include data describing the size of the buffer. The second set of computer code using the second computer language layer (206) operates on the data bridge structure (212-1) and determines that the buffer lacks sufficient space to store the requested data. The second set of computer code using the second computer language layer (206) operates on the data bridge structure (212-1). The second set of computer code using the second computer language layer (206) encounters an error and returns the error to the data communication system (110). The data communication system (110) uses an error correction system (114) to correct the error and re-drive the call to the second computer language layer (206).

The data bridge structure (212-1) may include a buffer, the buffer being a field that temporarily stores data until it is processed. The buffer may include data describing the size of the buffer. The second set of computer code using the second computer language layer (206) operates on the data bridge structure (212-1) and determines that the buffer lacks sufficient space to store the requested data. The second set of computer code using the second computer language layer (206) operates on the data bridge structure (212-1). The second set of computer code using the second computer language layer (206) encounters an error and returns the error to the data communication system (210). The data communication system (210) uses an error correction system (114) to correct the error and re-drive the call to the second computer language layer (206).

The error correction system (114) includes a receive engine (214-1) to receive a data bridge structure (212-1). The data bridge structure (212-1) includes data being communicated from a caller in a first computer language layer (205) driving a call to the second computer language layer (206). In one example, the data bridge structure (212-1) is preserved in a data communication system (110) while a copy of the data bridge structure (212-1) is used to communicate with a second set of computer code using a second communication language layer (206). In another example, the data bridge structure (212-1) is returned by the second set of computer code using the second computer language layer (206) when an error occurs. The data bridge structure (212-1) may contain a number of buffer fields. A buffer field contains an area of memory that is used to store data.

The error correction system (114) includes an examine engine (214-2) to examine the data bridge structure (212-1) to determine when an error has occurred. The second set of computer code using the second language layer (206) may use the data bridge structure (212-1) to store data to communicate to the first set of computer code using the first computer language layer (205). Data about an error may be assigned in the data bridge structure (212-1) when the error occurs. The examine engine (214-2) determines when the error occurs. The examine engine (214-2) may determine the type of error that occurred and may determine information about the nature of the error that occurred. Further, the examine engine (214-2) may determine information about the error based on data in the data bridge structure (212-1).

The error correction system (114) includes an act engine (214-3). The act engine (214-3) acts, based on the error, to resolve a cause of the error. In one example, a buffer field may be too small to store data provided by the second set of computer code using the second computer language layer (206). The act engine (214-3) acts to resolve the error by allocating memory to enlarge the buffer field. In another example, a buffer field may be allocated and associated with the data bridge structure. In still another example, the acting engine (214-3) acts by pausing, for an amount of time, to allow transient computer conditions to change. Further, additional actions may be taken to resolve a condition causing an error. The act engine (214-3) may perform a number of actions to resolve an error. The act engine (214-3) may send, to the driving caller, the data bridge structure (212-1) to allow the driving caller to correct the error. The act engine (214-3) may send, to the driving caller, data based on examining the data bridge structure. For example, the examine engine (214-2) may determine that a data field in the data bridge structure is out of range. When the act engine (214-3) is not able to correct the error, the act engine (214-3) acts by sending the data bridge structure to the driving caller to allow the driving caller to correct the error. The act engine (214-3) may send data identified by examining the data bridge structure to inform the driving caller of the nature of the error.

The error correction system (114) includes a re-drive engine (214-4). The re-drive engine (214-4) re-drives the call between the computer language layers (205, 206), when an error occurs, to obtain an updated computer data bridge structure (212-2). The updated data bridge structure (212-2) contains the results data associated with the call. The re-drive engine (214-4) may re-drive the communication a number of times to obtain an updated data bridge structure (212-2) from a successful call. The re-drive engine (214-4) may re-drive a number of calls to the second set of computer code using the second computer language layer to obtain an updated data bridge structure (212-2) from a number of successful calls.

The error correction system (114) includes a return engine (214-5). The return engine (214-5) returns to the caller in the first computer language layer (205) driving the call, the updated data bridge structure. The caller in the first computer language layer driving (205) the call may not be informed that the error correction system (114) has corrected an error. Instead, the caller in the first computer language layer driving (205) sees the successful call to the second set of computer code in the second computer language layer (206).

A specific example according to FIG. 2 will now be described. In this example, the first language module A (201-1) in the first set of computer code using the first computer language layer (205) communicates with a module implemented in the second set of computer code using the second computer language layer (206). The first language module A (201-1) assigns data to the first data bridge structure (212-1). The assignment may occur via a library wrapper function call, where arguments to a function are assigned to the first data bridge structure (212-1). The first language module A (201-1) may include code to assign data to the fields in the data bridge structure (212-1). The language module A (201-1) then sends the data bridge structure (212-1) to the data bridge transferring system (110). The data communication system (110) communicates the data to the second set of computer code using the second computer language layer (206). The second set of computer code using the second computer program layer (206) operates on the data bridge structure (212-1). The second set of computer code using the second computer language layer (206) encounters an error caused by a buffer in the data bridge structure (212-1) being too small to store the requested data. The second set of computer code using the second computer program layer (206) returns an error, through the data communication system (110), indicating that the buffer in the data bridge structure (212-1) is too small. The data communication system (110) then uses an error correction system (114) to correct the error received.

The receiving engine (214-1) in the error correction system (114) receives the data bridge structure (212-1). The data bridge structure (212-1) includes data being returned to a caller in a first computer language layer driving a call to the second computer language layer (206). The data bridge structure includes data sent from the first set of computer code using the first computer language layer (205) to the second set of computer code using the second computer language layer (206). The data bridge structure (212-1) includes an error return code. The error return code informs the error correction system (114) that the communication failed due to a lack of space to store requested data.

The examine engine (214-2) in the error correction system (114) examines the data bridge structure (212-1) to determine the error that has occurred. The data bridge structure (212-1) includes an indicator that the communication failed because a buffer in the data bridge structure (212-1) lacked sufficient space to store requested data. The examine engine (214-2) determines which of a number of buffers in the data bridge structure (212-1) lacks sufficient memory.

The act engine (214-3) in the error correction system (114) acts, based on the error in the data bridge structure (212-1). The error, indicating a lack of memory in the data bridge structure, causes the error correction system (114) to reallocate the data bridge structure, increasing the size of the buffer that lacks sufficient memory.

The re-drive engine (214-4) in the error correction system (114) re-drives the call to the second set of computer code using the second computer language layer (206). The re-drive engine (214-4) uses the additional memory allocated to re-drive the call to the second set of computer code to obtain an updated data bridge structure (212-2). The call operates on the updated data bridge structure (212-2). The updated data bridge structure (212-2) contains the result of the operation successfully performed by the second set of computer code using the second computer program layer (206).

The return engine (214-5) in the error correction system (114) returns the updated data bridge structure (212-2) to the caller in the first set of code using the first computer program layer (205). The first set of code using the first computer program layer (205) continues as though the call had succeeded on the first attempt.

Figure 3:
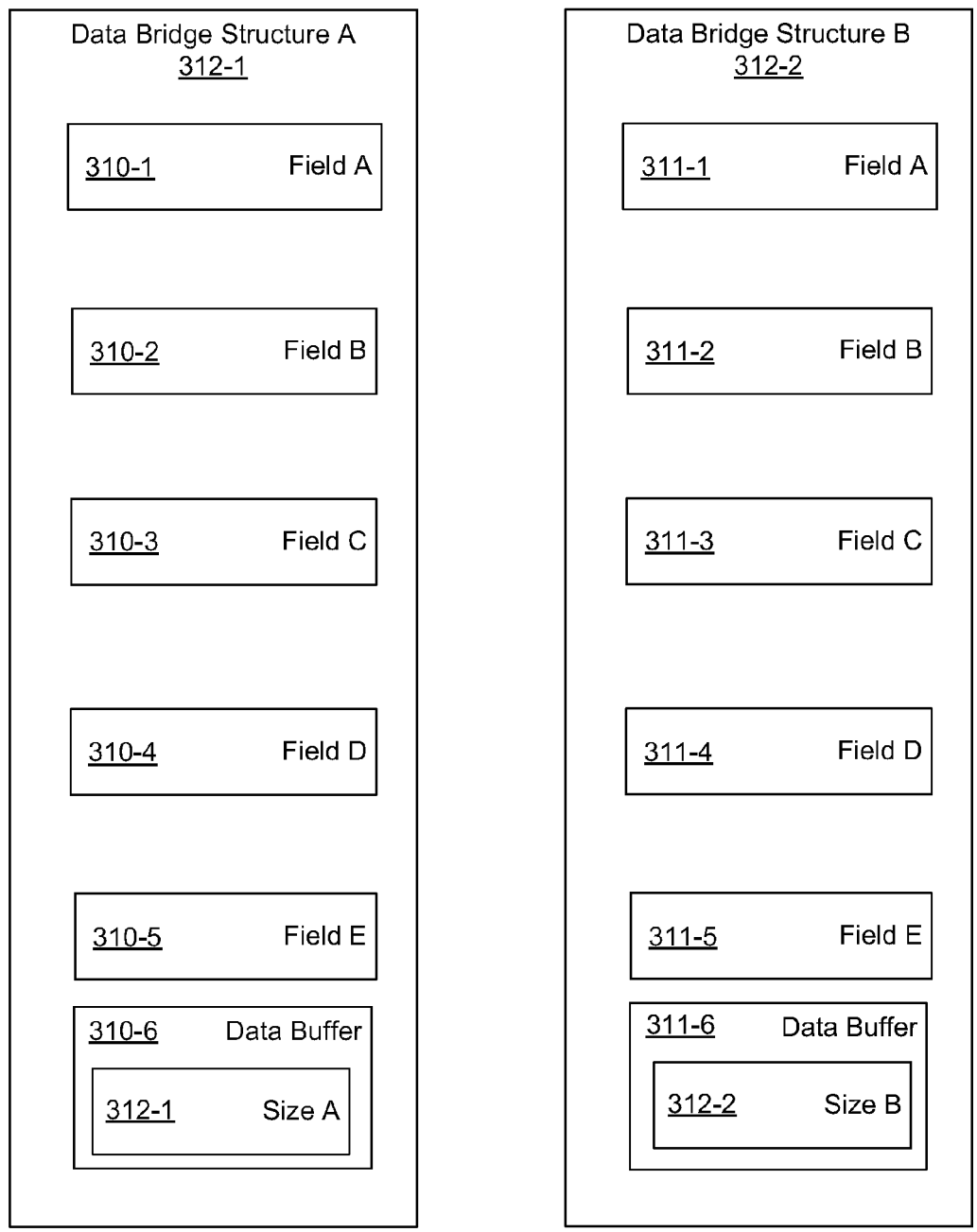
FIG. 3 is a diagram of a data bridge structure, according to one example of principles described herein.

FIG. 3 is a diagram of a number of data bridge structures (312), according to one example of principles described herein. As described above, the data bridge structures (312) are used by a data communication system (FIGS. 1 and 2, 110) to communicate data between a first computer language layer (FIG. 1, 105) and a second computer language layer (FIG. 1, 106). The data communication system (FIGS. 1 and 2, 110) uses an error correction system (FIGS. 1 and 2, 114) to handle errors that occur when communicating data between a first computer language layer (FIG. 1, 105) and a second computer language layer (FIG. 1, 106).

The data bridge structure A (312-1) includes a number of fields (310). The number of fields are used to communicate data between a first set of computer code using a first computer language layer (205) and a second set of computer code using a second computer language layer (206). The data bridge structure (310-1) includes field A (310-1), field B (310-2), fiend C (310-3), field D (310-4), field E (310-5), and a data buffer (310-6). Field A (310-1), field B (310-2), fiend C (310-3), field D (310-4), and field E (310-5) are used in the communication between the first set of computer code using the first computer language layer (FIG. 2, 205) and the second set of computer code using the second computer language layer (FIG. 2, 206) and do not relate to any error. The data buffer (310-6) has size A (313-1).

A call is made from the first set of computer code using the first computer language layer (FIG. 2, 205) to the second set of computer code using the second computer language layer (FIG. 2, 206). The second set of computer code using the second computer language layer determines that there is insufficient space in the data buffer (310-6) and returns an error indicating that the data buffer (310-6) is not large enough to store the requested data. The caller may be able to successfully drive the call with a larger sized data buffer.

The error correction system (FIG. 1, 114) re-drives the communication from the first set of computer code using the first computer language layer (FIG. 2, 205) to the second set of computer code using the second computer language layer (FIG. 2, 206) using data bridge structure B (312-2). The data buffer is larger in data bridge structure B (312-2) than in data bridge structure A (312-1). The larger data buffer allows the call to the second set of computer code using a second computer language layer (FIG. 2, 206). The second set of computer code using the second computer language layer succeeds, updating data bridge structure B (312-2). The error correction system (FIG. 1, 114) returns data bridge structure B (312-2) as an updated data bridge structure.

Figure 4:
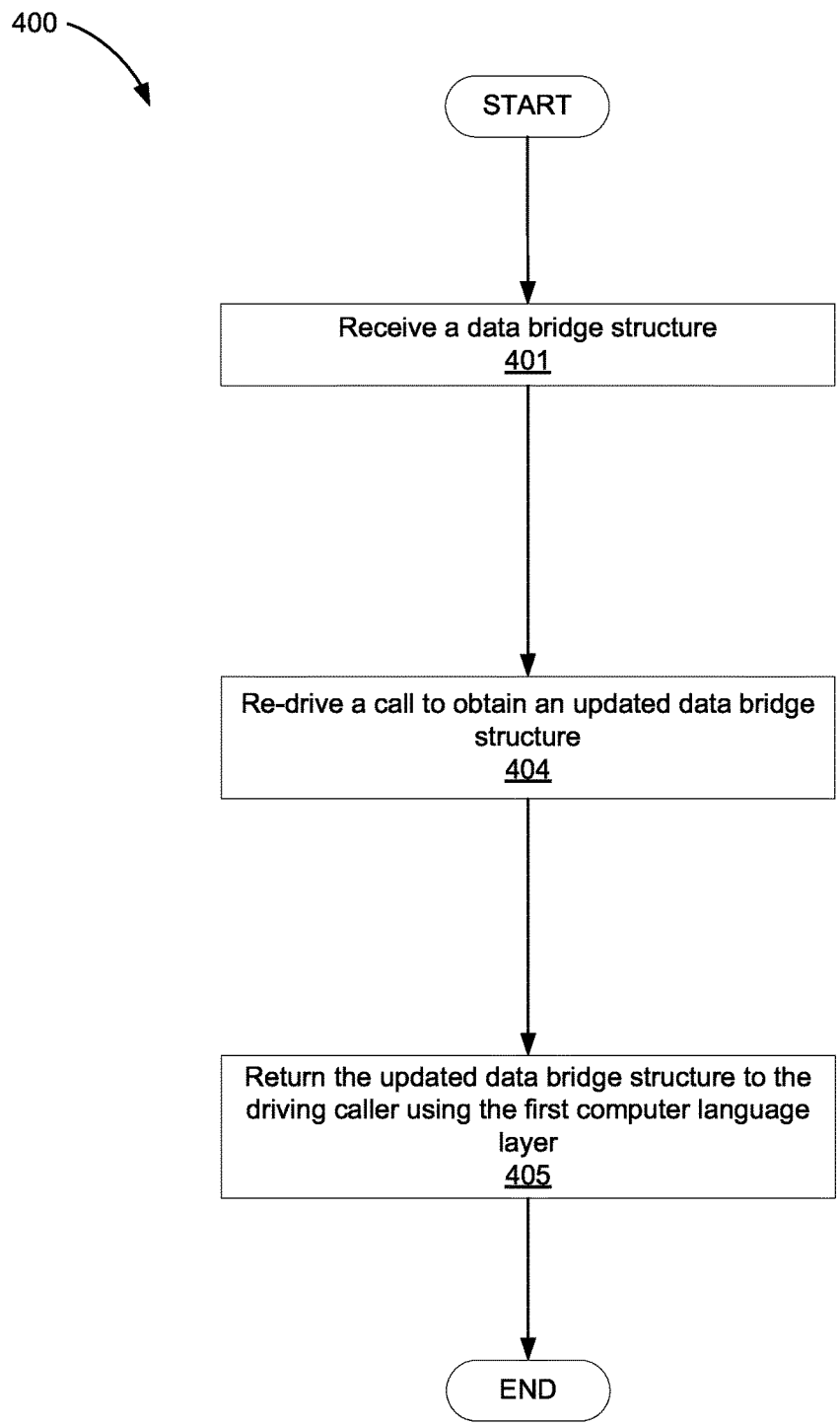
FIG. 4 is a flowchart of a method for handling errors when transferring data between computer language layers using a data bridge structure, according to one example of principles described herein.

FIG. 4 is a flowchart of a method for handling errors when transferring data between a first computer language layer (FIG. 1, 105) and a second computer language layer (FIG. 1, 106) using a data bridge structure (FIG. 2,212), according to one example of principles described herein. The method (400) may be executed by an error correction system (FIG. 1, 114) as described in FIG. 1. The method (400) may be executed by other systems (i.e. error correction system 600, system 700 of FIGS. 6 and 7, respectively).

Figure 6:
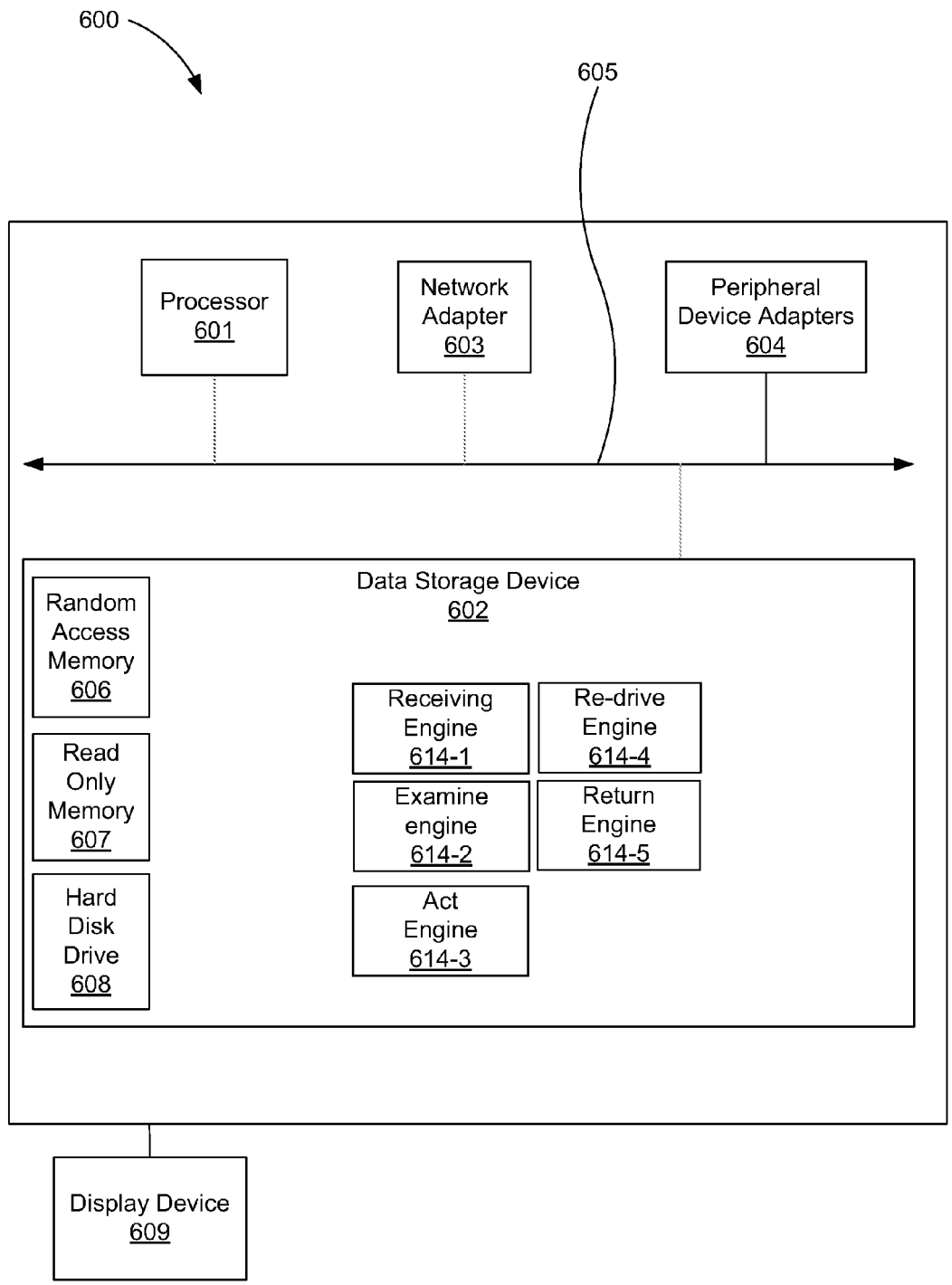
FIG. 6 is a block diagram of a computing device for handling errors when transferring data between computer language layers using a data bridge structure, according to one example of principles described herein.

The method (400) includes receiving (block 401) a data bridge structure (FIG. 2, 212-1). The data bridge structure (FIG. 2, 221) includes data being communicated between a driving caller (FIG. 2) using a first computer language layer (FIG. 1, 105) and a second set of computer code using second computer language layer (FIG. 1, 106). The data bridge structure (FIG. 2, 212-1) includes a number of fields (FIG. 3, 310). The number of fields (FIG. 3, 310) includes a data buffer (FIG. 3, 310-6). The data buffer (FIG. 3, 310-6) includes an amount of memory capable of storing data. A data buffer may be different for different instances of the data bridge structure. In one example, the method (400) receives (block 401) a data bridge structure (FIG. 2, 212-1) when the communication is made. In another example, the method (400) receives (block 401) a data bridge structure (FIG. 2, 212-1) when the second set of computer code using a second computer language layer (FIG. 2, 206) returns data to the caller using the first computer language layer (FIG. 2, 205).

The method (400) also includes re-driving (block 404), when an error occurs, the call between the computer language layers to obtain an updated data bridge structure (FIG. 3, 312-2). Re-driving (block 404) the call causes an attempt to be made to call again in order to try to get the call to succeed, without the driving caller handling the error. Re-driving (block 404) the call updates the data bridge structure (FIG. 3, 312-1) to create an updated data bridge structure (FIG. 3, 312-2). The updated data bridge structure (FIG. 3, 312-2) may include a larger data buffer (FIG. 3, 311-6) than the data buffer (FIG. 3, 310-6) in the data bridge structure (FIG. 3, 312-1). The re-driving (block 404) may re-drive the call between the computer language layers a number of times. The re-driving (block 404) may re-drive a number of calls between the computer language layers.

The method (400) also includes returning (block 405), to the driving caller in the first computer language layer driving the call, the updated data bridge structure (FIG. 3, 312-2). The updated data bridge structure (FIG. 3, 312-2) provides the driving caller with the data being communicated from the second set of computer code using the second computer language layer (FIG. 2, 206) after a successful call. The updated data bridge structure (FIG. 3, 312-2) is used by the caller in the first computer language layer (FIG. 2, 205).

Figure 5:
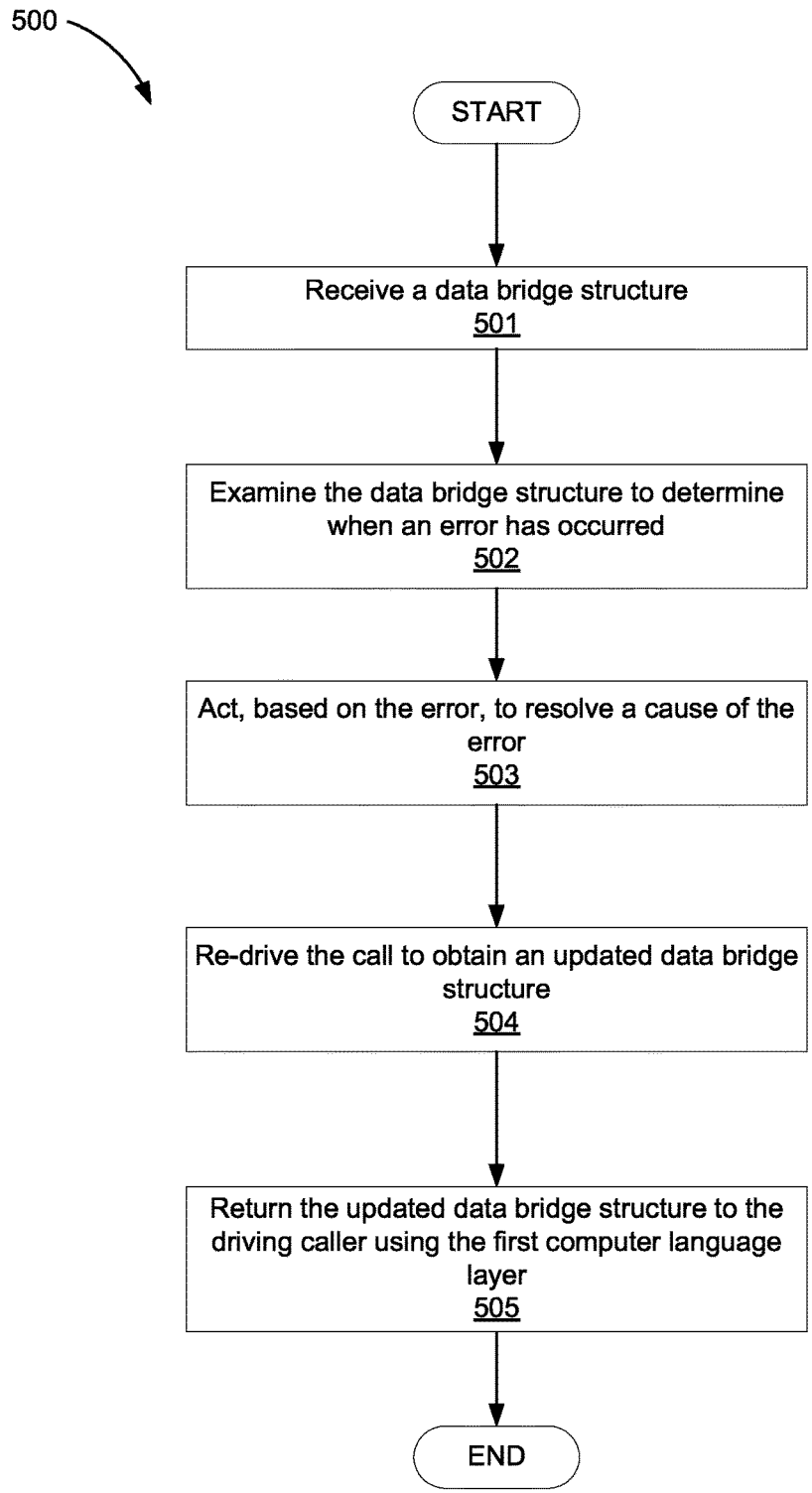
FIG. 5 is a flowchart of a method for handling errors when transferring data between computer language layers using a data bridge structure, according to another example of principles described herein.

FIG. 5 is a flowchart of a method for handling errors when transferring data between a first computer language layer (FIG. 1, 105) and a second computer language layer (FIG. 1, 106) using a data bridge structure (FIG. 2, 212), according to one example of the principles described herein. The method (500) may be executed by the error correction system (FIG. 1, 114). The method (500) may be executed by other systems (i.e. error correction system 600, system 700).

The method (500) includes receiving (block 501) a data bridge structure. The data bridge structure includes data being communicated between a driving caller (FIG. 2) using a first computer language layer and a set of computer code using a second computer language layer. This may be performed as described above in connection with FIG. 4.

The method (500) also includes examining (block 502) the data bridge structure to determine when an error will occur or has occurred. The second set of computer code using the second computer language layer (FIG. 2, 206) assigns data to the data bridge structure indicating that an error has occurred. Further, additional data may be assigned to the data bridge structure to provide information as to the nature of the failure and to inform the acting (block 503) as to possible resolutions of the cause of the error.

The method (500) also includes acting (block 503), based on the error, to resolve a cause of the error. The acting (block 503) may allocate memory to associate with the data bridge structure. The acting (block 503) may allocate a replacement data bridge structure to use in re-driving the call between the computer language layers. The acting (block 503) may pause, for an amount of time, to allow transient computer conditions to change. The amount of time may be a fixed amount of time. The amount of time may be selected randomly or pseudo-randomly to reduce contention for resources.

The method (500) also includes re-driving (block 504) the call between the computer language layers to obtain an updated data bridge structure. This may be performed as described above in connection with FIG. 4.

The method (500) also includes returning (block 505), to the driving caller in the first computer language layer, the updated data bridge structure. This may be performed as described above in connection with FIG. 4.

FIG. 6 represents a computing device (600) for correcting errors when transferring data between computer language layers (FIG. 1, 105, 106) according to one example of principles described herein. The computing device (600) for correcting errors when transferring data between computer language layers (FIG. 1, 105, 106) may be implemented by an electronic device. Examples of electronic devices include servers, desktop computers, laptop computers, personal digital assistants (PDAs), mobile devices, smartphones, gaming systems, and tablets, among other electronic devices.

The computing device (600) may be utilized in any data-processing scenario, including stand-alone hardware, mobile applications, a computing network, or combinations thereof. Further, the computing device (600) may be used in a computing network, a public cloud network, a private cloud network, a hybrid cloud network, other forms of networks, or combinations thereof. In one example, the methods provided by the computing device (600) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (600) are executed by a local administrator.

To achieve its desired functionality, the computing device (600) may include various hardware components. Among these hardware components may be a number of processors (601), a data bridge transferring system (602), a number of peripheral adapters (604), and a number of network adapters (603). These hardware components may be interconnected through the use of a number of buses and/or network connections. In one example, the processor (601), data bridge transferring system (602), peripheral device adapters (604), and network adapter (603) may be communicatively coupled via a bus (605).

The computing device (600) may include various types of memory modules, including volatile and nonvolatile memory. For example, the transferring system (602) may include Random Access Memory (RAM) (606), Read Only Memory (ROM) (607), and Hard Disk Drive (HDD) memory (608). Many other types of memory may also be utilized, and the present specification contemplates the use of as many varying type(s) of memory in the computing device (600) as may suit a particular application of the principles described herein. In other examples, different types of memory in the computing device (600) may be used for different data storage needs. In some examples, the processor (601) may boot from Read Only Memory (ROM) (607), maintain nonvolatile storage in the Hard Disk Drive (HDD) memory (608), and execute program code stored in Random Access Memory (RAM) (606).

The hardware adapters (603, 604) in the computing device (600) enable the processor (601) to interface with various other hardware elements, external and internal to the computing device (600). The peripheral device adapters (604) may provide an interface to input/output devices, such as a display device (609), a mouse, or a keyboard. The peripheral device adapters (603) may also provide access to other external devices, such as an external storage device, a number of network devices, such as servers, switches, and routers, client devices, other types of computing devices, or combinations thereof.

The display device (609) may be provided to allow a user of the computing device (600) to interact with and implement the functionality of the computing device (600). The peripheral device adapters (604) may also create an interface between the processor (601) and the display device (609), a printer, or other media output devices. The network adapter (603) may provide an interface to other computing devices within, for example, a network, thereby enabling the transmission of data between the computing device (600) and other devices located within the network.

The data storage device (602) may include a number of engines used in the implementation of the error correction system when transferring data between computer language layers (FIG. 1, 105, 106). The various modules within the computing device (600) comprise executable program code that may be executed separately. The various modules may be stored as separate computer program products. The various modules within the computing device (600) may be combined within a number of computer program products; each computer program product comprising a number of the modules.

The computing device (600) includes a receive engine (614-1) to receive a data bridge structure (FIG. 2, 212-1). The data bridge structure (FIG. 2, 212-1) includes data being communicated between a driving caller in a first computer language layer (FIG. 2, 205) and the second computer language layer.

The computing device (600) includes an examine engine (614-2) to examine the data bridge structure (FIG. 2, 212-1) to determine when an error has occurred. The examine engine (614-2) may act after a call is made to a second set of computer code using a second computer language layer (FIG. 2, 206). The second set of computer code using the second computer language layer may encounter an error and assign data related to that error to the data bridge structure (FIG. 2, 212-1). The data bridge structure (FIG. 2, 212-1) is examined to determine when an error occurs and to gather information as to the cause of the error.

The computing device (600) includes an act engine (614-3) to act, based on the error, to resolve the cause of the error. The act engine (614-3) may allocate memory to associate with the data bridge structure (FIG. 2, 212-1). The act engine (614-3) may allocate a replacement data bridge structure to use when re-driving the call between the computer language layers. The replacement data bridge structure may be updated to create an updated data bridge structure (FIG. 2, 212-2). The act engine (614-3) may pause, for an amount of time, to allow transient computer conditions to change. The act engine (613-3) may communicate the data bridge structure to the driving caller (FIG. 2) to allow the driving caller to correct the error. The act engine (613-3) may also communicate data based on examining the data bridge structure to the driving caller.

The computing device (600) includes a re-drive engine (614-4) to re-drive, when an error occurs, the call between the computer language layers to obtain an updated data bridge structure (FIG. 2, 212-2). The re-drive engine (614-4) may re-drive a call between the computer language layers a number of times. The re-drive engine (614-4) may re-drive a number of calls between the computer language layers to produce a result for the caller.

The computing device (600) includes a return engine (614-5) to return to the caller in the first computer language layer (FIG. 2, 205) driving the call, the updated data bridge structure (FIG. 2, 212-2). The caller may be unaware that a number of calls have been performed by the error correction system.

Figure 7:
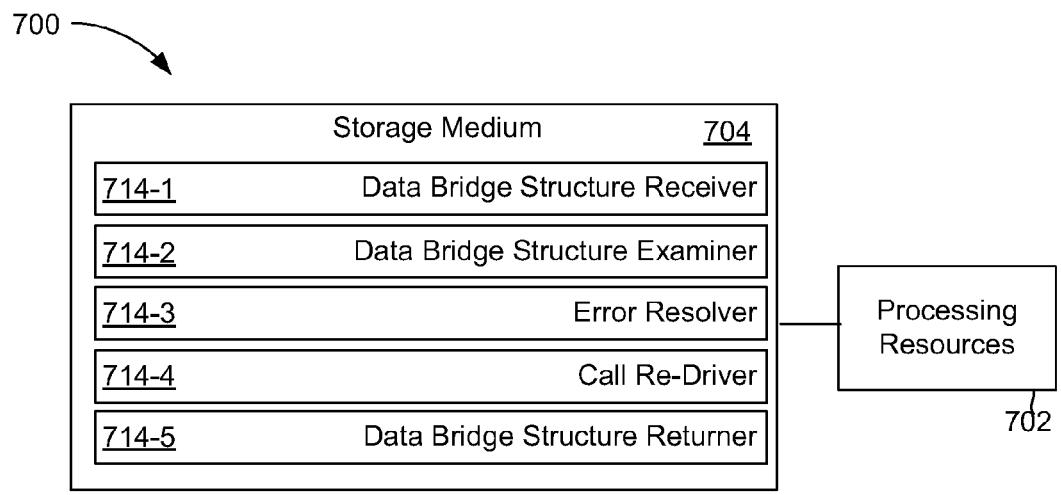
FIG. 7 is a block diagram of an error handling system, according to one example of principles described herein.

FIG. 7 is a diagram of an error correction system (700) according to one example of the principles described herein. The data bridge transferring system (700) includes processing resources (702) that are in communication with memory resources (704). The processing resources (702) include at least one processor and other resources used to process programmed instructions. The memory resources (704) generally represent any memory capable of storing data, such as programmed instructions or data structures to be used by the transferring system (700). The programmed instructions shown stored in the memory resource (704) include a data bridge structure receiver (714-1), a data bridge structure examiner (714-2), an error resolver (714-3), a call re-driver (714-4), and a data bridge structure returner (714-5).

The data bridge structure receiver (714-1) represents programmed instructions that, when executed, cause the processing resource (702) to receive a data bridge structure (FIG. 2, 212-1). The data bridge structure (FIG. 2, 212-1) includes data being communicated between a driving caller in a first computer language layer (FIG. 2, 205) and second computer language layer. The data bridge structure examiner (714-2) represents programmed instructions that, when executed, cause the processing resource (702) to examine the data bridge structure (FIG. 2, 212-1) to determine when an error has occurred.

The error resolver (714-3) represents programmed instructions that, when executed, cause the processing resource (702) to act, based on the error, to resolve the cause of the error. The act may include allocating additional memory, re-allocating memory, delaying subsequent calls, or other activity to resolve the error.

The call re-driver (714-4) represents programmed instructions that, when executed, cause the processing resource (702) to re-drive, when an error occurs, the call between the computer language layers to obtain an updated data bridge structure (FIG. 2, 212-2). The data bridge structure returner (714-5) represents programmed instructions that, when executed, cause the processing resource (702) to return to the caller in the first computer language layer (FIG. 2, 205) driving the call, the updated data bridge structure (FIG. 2, 212-2).

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer-implemented method for handling errors, the method comprising:
   receiving a data bridge structure, the data bridge structure comprising data being communicated between a driving caller using a first computer language layer and a set of computer code using a second computer language layer;
   in response to an error occurring, re-driving the call between the computer language layers to obtain an updated data bridge structure; and
   returning the updated data bridge structure to the caller in the first computer language layer driving the call.

2. The method of claim 1, further comprising acting, based on the error, to resolve a cause of the error.

3. The method of claim 2, wherein acting, based on the error, to resolve the cause of the error comprises allocating memory to associate with the data bridge structure.

4. The method of claim 2, wherein acting, based on the error, to resolve the cause of the error comprises allocating a replacement data bridge structure to use in re-driving the call between the computer language layers.

5. The method of claim 2, wherein acting, based on the error, to resolve a cause of the error comprises pausing, for an amount of time, to allow transient computer conditions to change.

6. The method of claim 1, wherein, in response to an error occurring, re-driving the call between the computer language layers comprises re-driving the call a number of times.

7. The method of claim 1, further comprising examining the data bridge structure in response to an error occurring to determine a nature of the error.

8. The method of claim 1, wherein re-driving the call between the computer language layers to obtain an updated data bridge structure comprises re-driving a number of calls between the computer language layers.

9. A system for handling errors, the system comprising:
   a processor;
   memory communicatively connected to the processor; and,
   an error correction system, the error correction system comprising:
      a receive engine to receive a data bridge structure, the data bridge structure comprising data being communicated between a driving caller using a first computer language layer and a set of computer code using a second computer language layer;
      an examine engine to examine the data bridge structure to determine when an error has occurred;
      an act engine to act, in response to an error occurred, to resolve a cause of the error;
      a re-drive engine to, in response to an error occurring, re-drive the call between the computer language layers to obtain an updated data bridge structure; and
      a return engine to return the updated data bridge structure to the caller in the first computer language layer driving the call.

10. The system of claim 9, wherein the act engine comprises allocating memory to associate with the data bridge structure.

11. The system of claim 9, wherein the act engine comprises generating a replacement data bridge structure to use in re-driving the call between the computer language layers.

12. The system of claim 9, wherein the act engine comprises pausing, for an amount of time, to allow transient computer conditions to change.

13. The system of claim 9, wherein the re-drive engine comprises re-driving the call a number of times.

14. A computer program product for presenting electronic messages, the computer program product comprising a non-transitory machine-readable storage medium having program instructions embodied therewith, the program instructions executable by a processor to cause the processor to:
   receive, by a receive engine, a data bridge structure, the data bridge structure comprising data being communicated between a driving caller using a first computer language layer and a set of computer code using a second computer language layer;
   act, by and act engine, to resolve a cause of an error;
   re-drive, by a re-drive engine and in response to an error occurring, the call between the computer language layers to obtain an updated data bridge structure; and
   return, by a return engine, the updated data bridge structure to the caller in the first computer language layer driving the call.

15. The product of claim 14, wherein acting to resolve a cause of the error comprises allocating memory to associate with the data bridge structure.

16. The system of claim 14, wherein acting to resolve a cause of the error comprises generating a replacement data bridge structure to use in re-driving the call between the computer language layers.

17. The system of claim 14, wherein acting to resolve a cause of the error comprises pausing, for an amount of time, to allow transient computer conditions to change.

18. The system of claim 14, further comprising computer program code to, when executed by a processor, examine the data bridge structure to determine when an error has occurred.

19. The system of claim 14, wherein acting to resolve a cause of the error comprises sending, to the driving caller, the data bridge structure to allow the driving caller to correct the error.

20. The system of claim 19, wherein sending, to the driving caller, the data bridge structure further comprises sending, to the driving caller, data based on examining the data bridge structure.

* * * * *